United States Patent [19]

Ahmed et al.

[11] 3,746,993

[45] July 17, 1973

[54] CARRIER DETECTION CIRCUIT

[75] Inventors: Mushtaq Ahmed; Sydney Glazer, both of San Diego, Calif.

[73] Assignee: The National Cash Register Company, Dayton, Ohio

[22] Filed: Dec. 27, 1971

[21] Appl. No.: 212,426

[52] U.S. Cl. ............... 325/320, 178/69 R, 325/364, 329/123

[51] Int. Cl. ............... H04b 7/16

[58] Field of Search ............... 178/69 R; 324/78 Q; 325/320, 364; 329/123

[56] References Cited

UNITED STATES PATENTS 3,627,949 12/1971 Krecic et al. ............... 325/320 X

*Primary Examiner*—Malcolm A. Morrison
*Assistant Examiner*—R. Stephen Dildine, Jr.
*Attorney*—J. T. Cavender, Lawrence P. Benjamin et al.

[57] ABSTRACT

Carrier detection circuit for use with an FSK modem receiver wherein a pair of phase lock circuits connected to the receiver are tuned to provide output voltage upon receipt of either a mark or space signal, and a third phase lock circuit connected to the receiver is tuned to provide an output voltage upon receipt of a mark signal. These voltages are applied to a Schmitt trigger to provide a carrier detect output voltage to digital utilization equipment.

11 Claims, 5 Drawing Figures

CARRIER DETECTION CIRCUIT

SUMMARY OF THE INVENTION

The present invention relates to a digital data communications system, and more particularly to a carrier detection circuit for use with a frequency shift key modem receiver. The present invention is directed toward a circuit to be employed in connection with a conventional frequency shift keying receiver for swiftly detecting the presence of a data transmission carrier, providing a turn-on signal, and preventing spurious turn-off signals caused by short bursts of noise while providing a positive turn-off signal upon the end of transmission.

A computer and associated peripheral devices are connected into the ordinary voice telephone communication system by a device for conditioning the digital signal for transmission over the telephone facilities and further conditioning the incoming signals for acceptance by the computer equipment. The equipment conditioning the incoming and outgoing digital signals is usually known as a modem, since the device modulates and demodulates a voice frequency carrier bearing the digital data signal.

The modem modulates a carrier with the digital pulse information from the computer, converting the pulses into an AC representation by means of frequency shift keying. A 1200 hertz frequency is usually employed to transmit a "mark", or binary one. A 2200 hertz frequency is employed to transmit a "space" or binary zero. In the invention as disclosed hereinbelow asynchronous, or start-stop, transmission is employed, wherein one character, comprising several mark and space bits, is sent at a time. However, the present invention may also be applied to synchronous transmission. In the normal asynchronous type of transmission each character transmitted is initialized by a start signal in the form of a space condition and terminated by a stop signal in the form of a mark condition. In prior art modem receivers, tuned circuits have generally been employed to detect the presence of the carrier frequencies on the line, and to differentiate between the mark and space frequencies. As is well known to those skilled in the art, high speed of operation requires broad bandwidth tuned circuits, while a good signal to noise ratio requires narrow bandwidth tuned circuits. As a result, modem receivers heretofore known in the art have represented a compromise, biased either toward high speed operation in special low noise environments, or toward low speed operation over normal noisy telephone lines. High speed units usually require specially processed telephone lines permanently connected between the terminals. Detection of the presence of a carrier at the receiver and determination of the end of the character takes place for each message transmitted, where a message may have one or more characters. It will be readily apparent that a substantial saving of time for detection of the beginning and end of transmission of a message enables closer spacing of messages and faster operation, particularly in the presence of noise. This enables more economical use of computer time as well as the telephone lines.

In the present invention, a plurality of phase lock circuits are employed to detect the presence of a carrier, thereby providing a carrier-on signal to the computer equipment. The phase lock circuits also provide the signal indicating the termination of the message by means of sensing the end of transmission.

In the present invention, the modem receiver is provided with the usual amplitude and delay equalizers and amplifiers. The modulated signals are applied to a zero crossing detector, which provides an output square wave having the frequency of the carrier. The square wave is applied to a digital differentiator whose output is a pulse train at the frequency of the square wave provided by the zero crossing detector. The differentiator output is employed in the receiver to provide the data after further processing.

The pulse output from the zero crossing detector is applied to a pair of phase lock circuits which are tuned to lock into the mark-space and space frequencies in the one case and into the mark frequency in the other. The outputs of the phase lock circuits are combined and passed through a low pass filter to a Schmitt trigger circuit. The equalized voice frequency carriers are applied to a third phase lock circuit through a buffer amplifer. The third phase lock circuit is normally tuned below the mark frequency, and is tuned to increase in frequency and lock into the mark frequency. The output of the third phase lock circuit is filtered and passed into the Schmitt trigger along with the output of the other two phase lock circuits. The Schmitt trigger fires when a carrier is present, providing an output signal to the computer utilization equipment.

DESCRIPTION OF THE INVENTION

The data input from a telephone line is in the form of a Frequency Shift Keying (FSK) signal with a 1200 hertz mark carrier and a 2200 hertz space carrier. These two frequencies are attenuated and delayed unequally by the characteristics of the telephone line. It is, therefore, necessary to provide an equalizer 11 to compensate for the characteristics of the telephone line. A buffer amplifier 12 amplifies the signal and isolates the telephone line and equalizer from the following circuitry. A space frequency signal and a mark frequency signal are illustrated at FIG. **5*a* at the input to the equalizer, and at FIG. 5*b***, at the output of the buffer amplifier.

Figure 5:
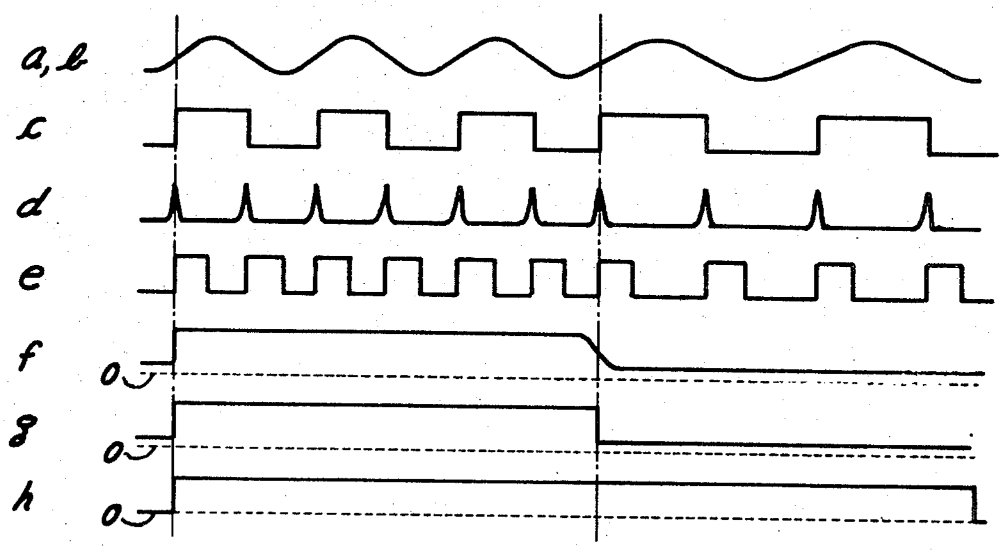
FIG. 5 represents a series of waves illustrating the operation of the carrier detection circuit of the present invention.

The voice frequency signals are applied to a zero crossing detector 13. The zero crossing detector provides a positive voltage upon the occurrence of a positive-going zero crossing and a negative voltage upon a negative-going zero crossing of the sinusoidal signal. The result is a square wave as illustrated at FIG. **5*c*. This square wave has the same frequency and phase as the voice frequency signals. The square wave of FIG. 5*c* is applied to a digital differentiator 14. Digital differentiator 14 is a logic circuit of a type well known to those skilled in the art providing the pulse train output illustrated by FIG. 5d. The output pulse train of FIG. 5d of digital differentiator 14 provides an output pulse at each positive going and each negative going portion of the square wave. The pulse train of FIG. 5d, therefore, is at a frequency twice that of the incoming voice frequency signals. The pulse train of FIG. 5d is applied to one-shot multivibrator 15, which converts the pulse train into a rectangular wave having a fixed pulse width determined by the characteristics of the one-shot multivibrator, and a frequency proportional to the mark and space carrier frequencies, as illustrated by FIG. 5e. The rectangular pulse train is applied to low pass filter 16, which converts the rectangular pulse train to a pair of DC levels as illustrated by FIG. 5f. Those pulses that are closer together, that is at the higher space frequency, provide a higher voltage output than those that are at the lower mark frequency. The two voltage levels from low pass filter 16 are then applied to a threshold detector 17. Threshold detector 17** provides an inverted data output signal; a zero output level, indicating a mark, and a five volt output level indicating a space. For normal level outputs the inverted data output would be phased such that the mark signal is at −12 volts and the space signal at + 12 volts.

Figure 1:
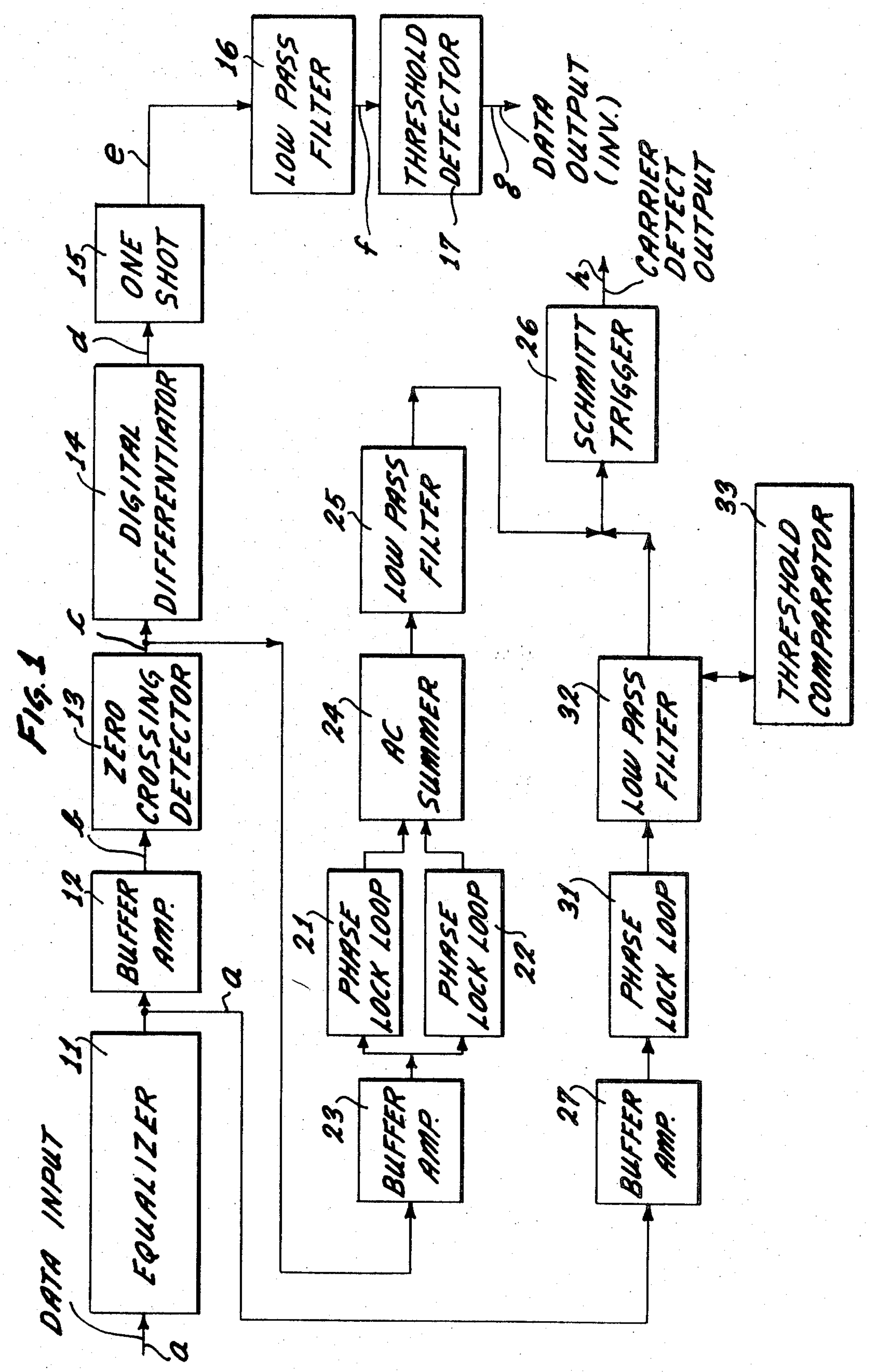
FIG. 1 illustrates the carrier detection circuit of the present invention together with an associated modem receiver.
Figure 2:
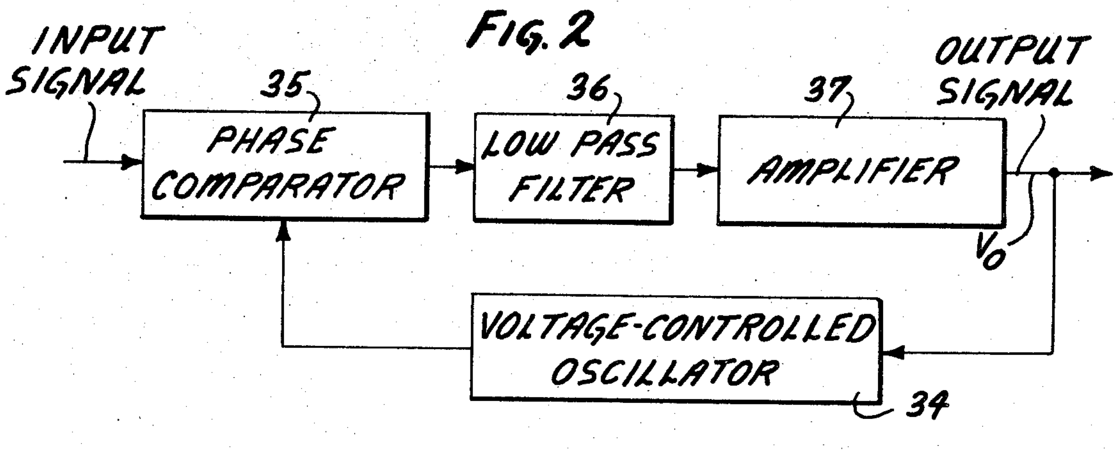
FIG. 2 illustrates a phase lock loop circuit of the type employed in the carrier detection circuit of the present invention.
Figure 3:
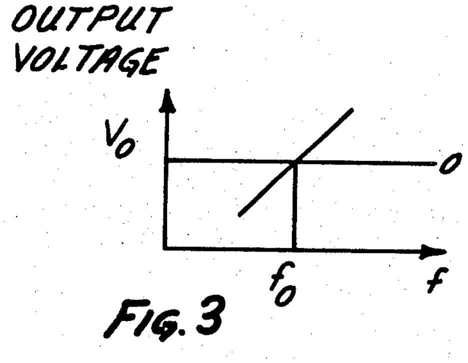
FIGS. 3 and 4 illustrate characteristics of the phase lock loop circuits employed in the present invention.
Figure 4:
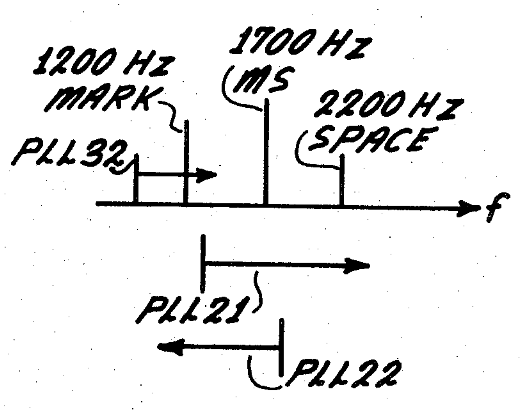

The square wave illustrated at FIG. 5c, from the zero crossing detector 13, is applied to phase lock circuit 21 and phase lock circuit 22 through buffer amplifier 23. The phase lock circuits as such are not part of the present invention. However, an understanding of the operation of phase lock circuits is helpful for understanding of the present invention. Referring to FIG. 2, a phase lock circuit comprises a voltage controlled oscillator 34, the output of which is applied to a phase comparator 35, together with an AC input signal. The phase comparator provides an output voltage proportional to the difference between the frequency and phase of the input signal and the output of the voltage controlled oscillator 34. The output of phase comparator 35 is filtered by low pass filter 36 and the resulting direct voltage is amplified by DC amplifier 37. The output voltage of DC amplifier 37 is fed back to voltage control oscillator 34 in such a direction as to reduce the output of phase comparator 35 to zero. As illustrated in FIG. 3, the frequency of voltage control oscillator 34 is indicated by the abscissa in FIG. 3. The voltage output from amplifier 37 is indicated by the ordinate of FIG. 3. Thus, it will be seen that as the frequency of voltage controlled oscillator 34 varies with respect to the input signal, the normalized output voltage, indicated as a $V_0$ in FIG. 3, varies in accordance with a substantially straight line characteristic.

The spectrum of an FSK signal includes frequencies other than the 1200 hertz mark signal and 2200 hertz space signal. Analysis of an FSK signal indicates that as the deviation ratio increases, energy tends to concentrate near the mark and space frequencies. Even if only the mark and space frequencies are transmitted as on-off carriers, a residual mid-frequency carrier is always present. Exemplarily, if an 1800 bit per second pulse rate is transmitted, alternating between 1200 Hz marks and 2200 Hz spaces, the spectrum will also include a 1700 hertz component carrier, as well as 800 hertz and 2600 hertz side bands. These spectrum components may readily be handled by phase lock circuits, since they are basically narrow band devices with a center frequency that very closely follows the frequency of the incoming signal. The phase lock loop is discussed at some length in an article entitled "The Monolithic Phase-Locked-Loop — A Versatile Building Block" by Allen D. Grebene in *IEEE Spectrum*, March 1971, at pages 38 through 49.

The square wave signal, FIG. 5c, from zero crossing detector 13 is applied to phase lock circuits 21 and 22 through buffer amplifier 23. This square wave remains at a constant level of 5 volts peak to peak although receiver input voltage may vary from a level of 0 dbm to −42 dbm. Buffer amplifier 23 reduces the voltage to ½ volt peak to peak to enable operation by phase lock circuits 21 and 22. The rest frequency of the voltage control oscillator of phase lock circuit 21 is set above the mark frequency but below the 1700 hertz mark-space spectrum component. Thus, if either the 1700 hertz mark-space component, or 2200 hertz space component in the spectrum is present, the oscillator frequency in phase lock circuit 21 will be increased to lock onto the spectrum component and provide a positive output signal. If only a mark signal is present, phase lock circuit 22 locks onto the mark frequency by decreasing in frequency, and providing a negative output voltage. The outputs of phase lock circuits 21 and 22 include AC components as the spectrum components vary, and DC components. The AC summer 24 removes the DC components present at the outputs of phase lock circuits 21 and 22, acting as a high pass filter and rectifier. The input to low pass filter 25 is negative whenever either a mark or mark space or space signal is present. Thus, either a mark or a space carrier signal provides an input to low pass filter 25. The low pass filter 25 inverts and filters the output from AC summer 24 to provide a DC signal to Schmitt trigger 26. The voltage level is greater than 80 millivolts whenever coherent energy is present on the telephone line. Absence of coherent energy in the bandwidth of interest reduces the output of low pass filter 25 below 80 millivolts, turning off the Schmitt trigger.

The output of equalizer 11 is applied through a buffer amplifier 27 to a third phase lock circuit 31. This signal is sinusoidal, having a peak-to-peak voltage lower than 1 volt, varying in amplitude with the signal level. Buffer amplifier 27 amplifies the signal to enable operation of phase lock circuit 31. When a mark signal at 1200 hertz is present on the line, phase lock circuit 31 locks onto the mark signal frequency by increasing the frequency of its voltage control oscillator. When this occurs, a positive output voltage appears at the output terminal of phase lock loop 31. This voltage is filtered and compared to a threshold comparator circuit 33. Whenever the signal from phase lock circuit 31 exceeds the threshold voltage, an 800 millivolt pulse is presented to the input of the Schmitt trigger 26, turning the Schmitt trigger on, and making the inverted carrier detect output go to 5 volts. The Schmitt trigger 26 is designed with sufficient hysteresis so that, when turned on, the turn-off threshold is decreased to 80 millivolts. Similarly, when the Schmitt trigger 26 is turned off, the threshold voltage to turn the trigger on is increased to 800 millivolts. Thus, only the signal from phase lock circuit 31 can turn the Schmitt trigger on. Once the Schmitt trigger is turned on, the output signal from low pass filter 25 will keep the Schmitt trigger on as long as coherent energy in the band is being received.

What is claimed is:

1. In a frequency shift keying modem with a receiver having a signal equalizer and a zero crossing detector, a carrier detection circuit comprising:
a trigger circuit;
first carrier detection means connected to said trigger circuit turning said trigger circuit on in response to a mark frequency signal; and
second carrier detection means connected to said trigger circuit keeping said trigger circuit on in response to the presence of carrier frequency signals.

2. The carrier detection circuit of claim 1 wherein:
said first carrier detection means includes a first phase lock circuit in circuit with said equalizer and effective to provide an output voltage in response to a mark carrier frequency.

3. The carrier detection circuit of claim 2 wherein:
said second carrier detection means includes a second phase lock circuit in circuit with said zero crossing detector effective to provide a mark output voltage rectangular wave from said zero crossing detector; and
a third phase lock circuit in circuit with said zero crossing detector effective to provide a space output voltage in rectangular wave from said zero crossing detector.

4. The carrier detection circuit of claim 3 wherein first low pass filter means is connected in circuit with said first phase lock circuit effective to provide a first direct voltage in response to a mark frequency carrier.

5. The carrier detection circuit of claim 4 wherein second low pass filter means is connected in circuit with said second and third phase lock circuits effective to provide a second direct voltage in response to said space and mark frequency rectangular waves.

6. The carrier detection circuit of claim 5 wherein said first and second low pass filter means are connected to said trigger circuit whereby said trigger circuit is turned on by an output voltage from said first low pass filter means and kept on by an output voltage from said second low pass filter means.

7. The carrier detection circuit of claim 6 wherein said first phase lock circuit includes a first voltage controlled oscillator having a normal frequency of oscillation lower than the mark signal frequency, a first phase comparator connected to said signal equalizer and to said first voltage controlled oscillator to generate a first difference voltage, and means for applying said first difference voltage to said first voltage controlled oscillator to synchronize with said mark frequency signal by increasing frequency of said first voltage controlled oscillator.

8. The carrier detection circuit of claim 7 wherein said second phase lock circuit includes a second voltage controlled oscillator having a normal frequency of oscillation lower than the space signal frequency, a second phase comparator connected to said zero crossing detector and to said second voltage controlled oscillator to generate a second difference voltage, and means for applying said second difference voltage to said second voltage controlled oscillator to synchronize with said space frequency signal by increasing frequency of said second voltage controlled oscillator.

9. The carrier detection circuit of claim 8 wherein said third phase lock circuit includes a third voltage controlled oscillator having a normal frequency of oscillation higher than the mark signal frequency, a third phase comparator connected to said zero crossing detector and to said third voltage controlled oscillator to generate a difference voltage, and means for applying said difference voltage to said third voltage controlled oscillator to synchronize with said mark frequency signal by decreasing frequency of said third voltage controlled oscillator.

10. In a frequency shift keying modem with a receiver having a signal equalizer and a zero crossing detector, a carrier detection circuit comprising:
a first phase lock circuit in circuit with said equalizer tuned to provide an output voltage upon receipt of a mark frequency carrier signal; and
second and third phase lock circuits in circuit with said zero crossing detector, said second phase lock circuit tuned to provide a second output voltage upon occurrence of a space carrier and said third phase lock circuit tuned to provide a third output signal upon occurrence of a mark carrier;
combining means connected to said second and third phase lock circuits for combining said second and third output signals to provide an output voltage;
a Schmitt trigger circuit connected in circuit with said means and said first phase lock circuit to provide a carrier detect voltage upon receipt of a carrier signal.

11. In the carrier detection circuit of claim 10, threshold comparator means in circuit with said first phase lock circuit enabling said Schmitt trigger circuit to be turned on by the output voltage from said first phase lock circuit and kept on by the output voltage from said combining means.

* * * * *